United States Patent [19]

Smith

[11] 4,354,641
[45] Oct. 19, 1982

[54] APPARATUS FOR REMOVING NO-BAKE COATINGS FROM FOUNDRY SAND AND CLASSIFYING THE RECLAIMED SAND

[75] Inventor: William J. Smith, Hazelton, Pa.

[73] Assignee: Weatherly Foundry & Manufacturing Co., Weatherly, Pa.

[21] Appl. No.: 250,238

[22] Filed: Apr. 2, 1981

Related U.S. Application Data

[60] Division of Ser. No. 15,206, Feb. 26, 1979, Pat. No. 4,283,015, which is a continuation-in-part of Ser. No. 847,749, Nov. 2, 1977, abandoned.

[51] Int. Cl.³ .............................................. B02C 19/06
[52] U.S. Cl. ..................................... 241/40; 241/79.1; 241/DIG. 10; 164/5
[58] Field of Search .................. 209/137, 138, 139 R; 164/5, 412; 241/5, 15, 18, 19, 24, 29, 40, 62, 79.1, 152 A, 601, DIG. 10, 274, 275

[56] References Cited

U.S. PATENT DOCUMENTS

| | | | |
|---|---|---|---|
| 2,119,887 | 6/1938 | Myers | 241/40 |
| 2,175,457 | 10/1939 | Dunn | 241/40 |
| 2,478,461 | 8/1949 | Connolly | 241/DIG. 10 X |
| 3,896,984 | 7/1975 | Edwards | 241/DIG. 10 X |

FOREIGN PATENT DOCUMENTS

| | | | |
|---|---|---|---|
| 2519135 | 11/1975 | Fed. Rep. of Germany | 164/5 |
| 51-80618 | 1/1976 | Japan | 164/5 |
| 1195226 | 6/1970 | United Kingdom | 164/5 |

*Primary Examiner*—Mark Rosenbaum
*Attorney, Agent, or Firm*—Roland T. Bryan

[57] ABSTRACT

An apparatus for reclaiming no-bake foundry sand is provided, in which a fluidized stream of pneumatically conveyed particles of no-bake coated sand grains traveling at velocity sufficient for transport is discharged against a target to fracture the no-bake rigid coatings from the sand grains on impact. Certain of the fractured coatings are removed and the sand grains along with any remaining fractured coating particles are directed through a passageway having a fluidizing air stream induced therein. The air stream entrains and carries off the fractured coatings and the fine sand grains so that only sand grains of desired particle size pass through the air stream for subsequent reuse. Advantageously, the velocity of the air stream is controlled by regulating the cross-sectional area of the passageway at the point at which the air stream is induced.

15 Claims, 3 Drawing Figures

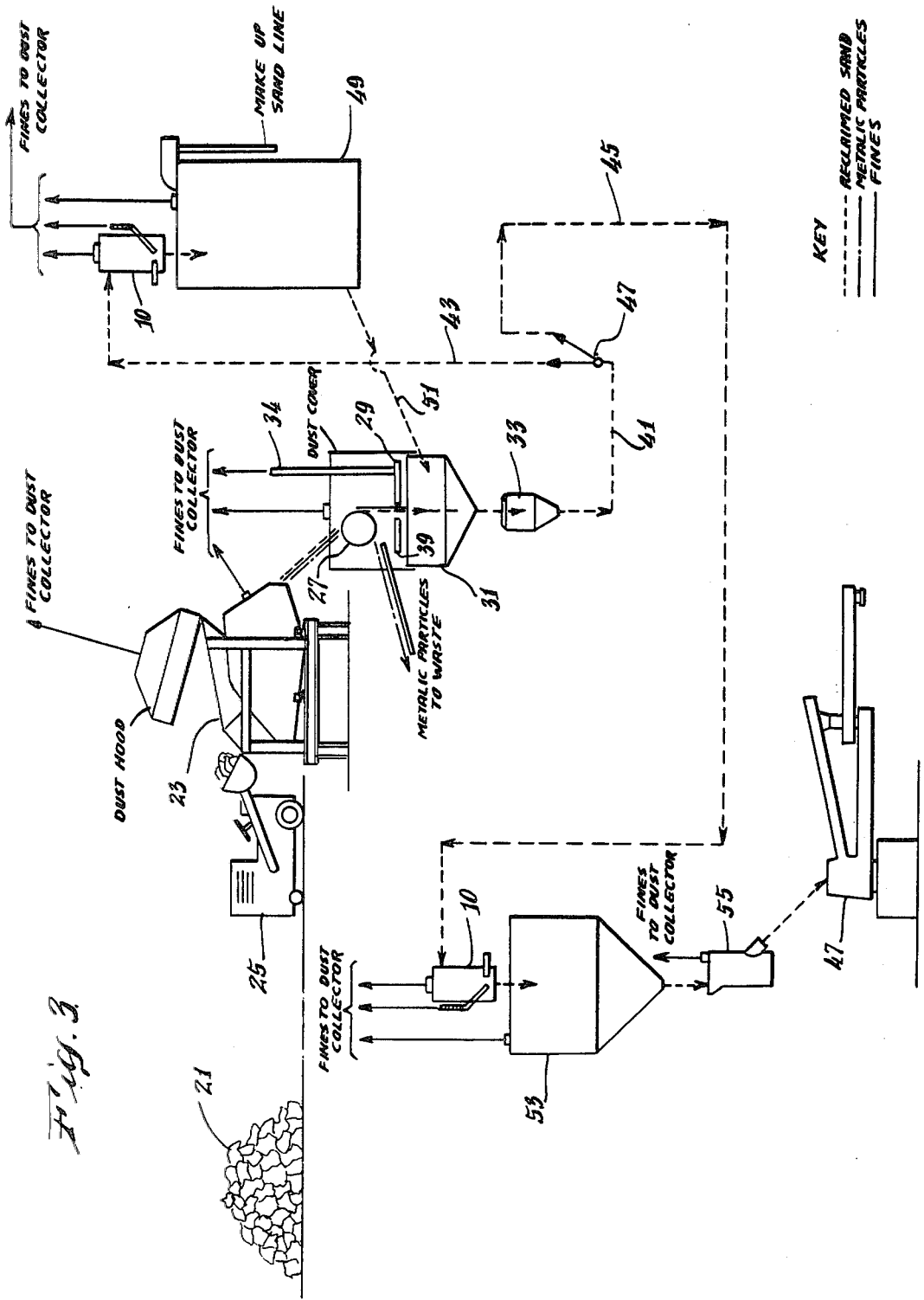

APPARATUS FOR REMOVING NO-BAKE COATINGS FROM FOUNDRY SAND AND CLASSIFYING THE RECLAIMED SAND

This application is a division of application Ser. No. 15,206, filed Feb. 26, 1979, now U.S. Pat. No. 4,283,015, which is a continuation-in-part of application Ser. No. 847,749, filed Nov. 2, 1977, now abandoned.

BACKGROUND OF THE INVENTION

No-bake foundry sand is foundry sand mixed with a self setting binder that fixes the sand in position without the necessity of baking. The most widely used no-bake binder is one which, in the presence of a catalyst, reacts to coat individual foundry sand grains with a continuous film coating that hardens on curing to produce a rigid castable sand mold without the application of heat or pressure. Typical organic no-bake binders are furan resins, phenolic urethanes and oil urethanes, while a typical inorganic binder is sodium silicate. See Haine, "Updating No-Bake Molding Systems," FOUNDRY M & T, February 1975 at page 66.

Molten metal is then poured into the no-bake sand mold to produce a casting. In casting, some of the no-bake rigid coatings are burned off from the sand grains directly exposed to the molten metal, but approximately ninety percent of the sand is fixed by encasement in the bonding film and is thus rendered useless as foundry sand for reuse unless the rigid no-bake film coating is removed from the sand. Typical means for removing coatings from foundry sand have been by heat or abrasion. Heat or thermal reclamation, is slow and expensive, while abrasion is not very effective for removing no-bake coatings because the rigid coatings are very smooth and scratch resistant.

Existing foundry sand reclaimers utilize abrasive methods for removing soft non-carbonaceous coatings such as clay, bentonite and silica from sand. These types of binding materials form soft coatings which can be readily removed by "rubbing" abrasive methods, see U.S. Pat. Nos. 4,025,419 to Muschoot, 2,707,214 to Horth and 2,478,461 to Connolly. However, such sand reclaimers depending on abrasive methods are not effective for removing no-bake coatings from foundry sand, since the abrasive action is not entirely effective for completely removing the rigid coatings.

The "air scrubber" is another type of foundry sand reclaimer. Heretofore known air scrubbers utilize "blast tubes," "gun barrels" and/or "nozzles" to accelerate sand by means of compressed air to very high velocities to break and wear off burned clay coatings; see for example, U.S. Pat. Nos. 2,119,886 and 2,119,887 to Myers. Such air scrubber reclaimers are not energy efficient, in that a lot of power is required to accelerate the sand. Moreover, the sand is accelerated to high velocities, which is not desirable for recovering no-bake foundry sand since much of the sand is thereby disintegrated during reclamation and rendered unsuitable for further use.

These sand reclaimers are also based on the "unit" design concept. The "unit" design concept consists of a single device into which used sand is charged and from which reclaimed sand is discharged. Such reclaimers suffer from the drawback that sand quality deteriorates with transporting and other handling of the sand from the reclaimer to the point of use, therefore, the reclaimed sand product is not the same at the point of use as it was at the reclaimer "unit" discharge.

In addition, heretofore known air classifiers for separating materials are only suitable for separating lighter particles from heavier denser particles. Such air classifiers utilize countercurrent air flow to float and "waft" unwanted lighter particles from a decending mixture; see, for example, U.S. Pat. No. 1,650,727 to Stebbins, U.S. Pat. No. 3,312,342 to Brown, and U.S. Pat. No. 2,203,959 to Hammack. Such air classifiers are not suitable for use in classifying foundry sand where reclaimed sand grains of a certain AFS grain fineness number and screen analysis are desired.

SUMMARY OF THE INVENTION

In the present invention, used sand molds are comminuted and reduced to discrete particles of no-bake rigid coated sand grains. The particles are fluidized and pneumatically transported toward a target at velocity sufficient for pneumatic transport. Without accelerating the coated particles to higher velocities, the particles are impacted against a target to fracture off the coatings from the sand grains. The fractured coatings are removed and the sand is directed through a passageway in which a fluidizing air stream is induced across the falling sand, at velocity sufficient to entrain remaining fractured coatings and fine sand grains, so that only sand grains of desired particle size pass through the air stream. The velocity of the particle separating stream air is controlled by adjusting the cross-sectional area of the passageway at the point at which the air flow is induced.

Initially, shake-out lumps are fed into a sand lump breaker for crushing the lumps down to discrete particles of sand grains encased in rigid no-bake film. Foreign material and metallic particles are removed and the no-bake coated sand particles are fluidized and pneumatically transported through a conduit at the lowest speed consistent with fluidized transport to point of use.

At the end point of use, the stream of particles traveling at transport velocity is discharged from the conduit against a fixed rigid target in a chamber to fracture off the rigid coatings. Advantageously, the coated particles are pneumatically transported toward the target at the velocity just sufficient for transport; acceleration toward the target is not necessary. As the coated particles impact against the target at transport speed, their rigid coatings are fractured from the sand grains and removed by suction means. Sand grains, along with any remaining coating particles are directed to a passageway where final removal of the coating particles, referred to as fines, and classification of the sand grains according to particle size takes place, by having sand grains and fines pass through a particle separating air stream. The fluidizing air stream carries off the fines and abraded sand grains from the stream of sand being discharged so that only sand grains of desired particles size can pass through for subsequent reuse. A dust collector connected to the chamber provides the suction for removing fines from the target area, as well as the suction for inducing the air stream across the sand material being discharged. The velocity of the fluidizing air and the degree of particle separation that can occur is controlled by varying the cross-sectional area of the passageway at the point at which the air flow is induced.

This unique approach toward no-bake foundry sand reclamation which begins at mold shake-out and ends at point of use is not only effective in removing no-bake coatings from foundry sand, but is equally effective in minimizing unnecessary sand deterioration that would otherwise occur if reclaimed sand grains were pneumatically transported from a "unit" reclaimer to point of use. The abrasion that sand particles undergo as they are pneumatically transported serves advantageously in this system to aid in removing fractured coatings from sand grains, since the coatings undergo surface wear which will facilitate their removal when the coated particles are impacted against a rigid target at the discharge end of the sand transport line.

An object of the present invention is to reliably remove the rigid coatings from no-bake foundry sand to enable reuse of the foundry sand.

A further object of the present invention is to utilize the forces used in fluidizing particles of no-bake foundry sand for pneumatic transport to point of use for fracturing the no-bake coatings from the sand grains.

Yet another object of the present invention is to utilize the forces used in removing fractured coating particles from foundry sand for classifying the sand grains according to particle size.

A still further object of the present invention is to provide a no-bake foundry sand reclaimer utilizing a pneumatic transport system as an integral part of a system for separating coatings from sand grains, as well as utilizing a dust collector not only for removing fines, but for classifying sand grains according to particle size as well, the system being less expensive to install, requiring less maintenance and less energy to operate than conventional systems.

Other objects, aspects and advantages of the present invention will be apparent from the detailed description and the drawings.

BRIEF DESCRIPTION OF THE DRAWINGS

The preferred embodiment of the present invention is illustrated in the drawings, in which:

FIG. 3 is a schematic illustration of a system for reclaiming no-bake foundry sand.

DETAILED DESCRIPTION OF THE PREFERRED EMBODIMENT

Figure 1:
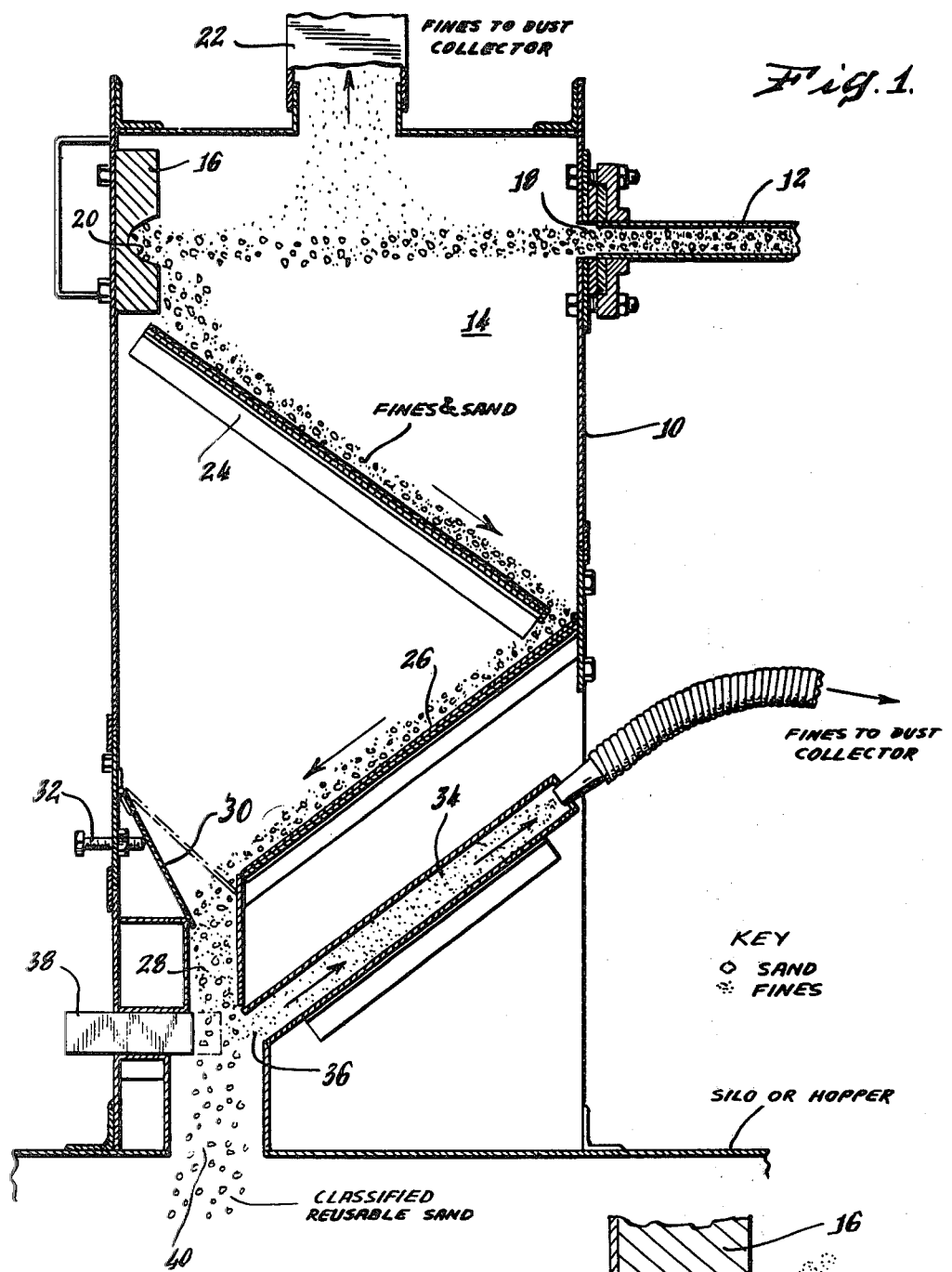
FIG. 1 is a vertical section through the apparatus for reclaiming and classifying the no-bake foundry sand.
Figure 2:
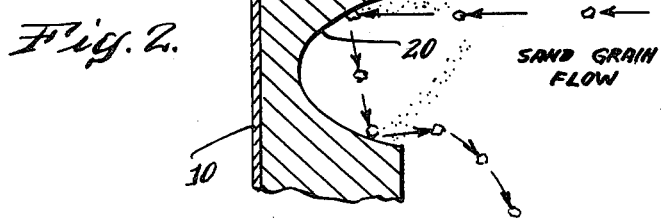
FIG. 2 is an enlarged view of the target illustrated in FIG. 1.

Referring to FIG. 1, a no-bake foundry sand reclaimer 10 is shown. Foundry sand, which has been reduced to discrete particles of no-bake rigid coated sand grains is fluidized to velocity just sufficient for pneumatic transport to the reclaimer by means of a conduit 12. The conduit 12 serves to transport the coated particles to the reclaimer 10 at a relatively constant velocity. Without being accelerated, the fluidized stream of no-bake coated sand grains is discharged from the conduit 12 into a chamber 14 through an inlet 18 to impact against a target 16, whereupon the no-bake rigid coatings fracture on impact and separate from the sand grains as fines. The target 16 has a wear resistant impact surface 20 at least as large as the cross-sectional area of the impacting stream of no-bake rigid coated sand particles. Advantageously, the impact surface 20 is concave, and preferably in the form of an inverted parabola to provide multiple impacting of the no-bake foundry sand particles thereon as illustrated in FIG. 2.

Located in the upper portion of chamber 14 proximately to the target 16 and the stream of coated particles impacting thereon, is a vent 22 connected to a conventional dust collector, not shown, for exhausting fines via a source of suction derived from the dust collector.

Positioned below the target 16 are downwardly inclined ramps 24 and 26 for conveying the sand grains and the fractured coatings falling from the target 16 and the fines that have not been exhausted through the vent 22 to a vertical discharge passageway 28. Two ramps are illustrated, but it should be understood that any number can be used for the purpose of providing a turbulent mixing action to provide for a homogeneous mixture of material and for quieting and organizing the material falling from the target 16 to form a full width curtain of material that will pass through the passageway 28 at a uniform rate. Positioned at the end of the ramp 26 adjacent the passageway 28 is an adjustable flow gate 30 for controlling the amount of material that can pass over the edge of the ramp and fall into the passageway 28. The flow gate 30 is adjusted by means of a bolt 32. There is an exit 40 at the end of the passageway 28 from which recovered sand discharges for subsequent reuse.

Branching off laterally from vertical passageway 28, preferably at an angle of approximately 45° in a quadrant counter to the line of flow of the sand through the passageway 28, is a duct 34. The duct 34 is connected to a source of suction, derived from a conventional dust collector not shown, to draw air across the falling particulate in the passageway 28 through an opening 36. The induced air flow carries off fines and undersized sand grains from the falling particle stream through the duct 34 to the dust collector. The duct 34 may also be located at an angle 90° to the line of flow of sand in the passageway or any other angle in a quadrant counter to the line of flow of sand. However, it has been found that the duct is optimally efficient in removing fines when mounted at 45° angle since blockage of the duct 34 by buildup of fines in the duct near the opening 36 is prevented.

The velocity of the fluidizing air flow through the particles in the passageway is controlled by adjusting the cross-sectional area of the passageway exterior to the opening 36 by means of an adjustable member 38. The velocity of the fluidizing air entering the opening 36 may be varied as desired by moving the adjustable member 38 toward or away from the opening 36.

The free falling particles entering the perpendicular air flow have a predominant downward vertical force component due to gravity. The right angle air flow subjects the particles to a horizontal force component which when added to the vertical force component, deflects the particles to follow a trajectory path toward the opening 36 in their downward movement through the separating air flow.

At a given flow velocity, particles of a specific size and smaller will have their downward path through the perpendicular air flow altered more than particles larger than said specific size. Particles of said specific size and smaller are thereby deflected into the opening 36 and removed by the duct 34.

By proper adjustment of the adjustable member 38, the desired velocity may be established for removing fines as well as undersized sand grains, such that foundry sand of desired particles size will be discharged at exit 40 of the foundry sand reclaimer 10 for subsequent reuse.

The sand reclaimer 10 is much more efficient in recovering foundry sand than a conventional air scrubber that accelerates sand for reclamation because less sand is disintegrated on impact. Furthermore, the sand reclaimer 10 also consumes less energy because the sand is not being accelerated to high velocities for reclamation.

In FIG. 3, a system for reclaiming no-bake foundry sand is shown incorporating the foundry sand reclaimer 10 of FIG. 1.

In this system shake-out sand lumps 21 are fed into a conventional sand lump breaker 23 by means of a pay loader truck 25 and crushed to discrete particles of sand grains coated with rigid no-bake film. Any suitable commercially available sand lump breaker may be used, such as units utilizing a vibrating chamber into which sand lumps are introduced and caused to abrade against each other by the vibrating chamber to produce discrete particles of no-bake coated sand grains. Such a unit is advantageously modified to include an additional mill, for example, a rod-mill at its discharge end for additional sand crushing by mechanical means to obtain grain sized sand with no-bake coatings thereon.

The coated sand discharging from the lump breaker 23 passes through a conventional metallic particle separater 27 which removes foreign metallic material from the sand by magnetic means. The sand is then passed through an air classifier 29 which removes fractured coating particles from the sand material before discharge into a hopper 31 feeding a pneumatic transporter 33.

The air classifier 29 separates fines from the sand material by passing fluidizing air through the material at velocity sufficient to entrain and carry off the fines from the sand material into and through a duct 34 to a dust collector not shown. The velocity of the fluidizing air is controlled by an adjustable member 39, moving the member toward or away from the opening to the duct 35 junction where the conduit 41 branches into the conduits 43 and 45 is a switch 47 for diverting sand flow into either of the two conduits. If sand is not immediately required for making new sand molds, then the stream of sand is diverted by the switch 47 into the conduit 43 for discharge into a sand reclaimer 10 with classified reusable sand exiting into a silo 49 for storage. Stored sand from the silo 49 is returned to the sand transport system for use as required by a sand line 51 connected to the hopper 31 feeding the pneumatic transporter 33.

When sand is required at the point of use, the switch 47 diverts sand flow into the branch conduit 45 feeding sand reclaimer 10, with reusable sand discharging into a hopper 53 which feeds sand at a uniform rate to a sand heater 55 for heating to desired temperature. The reclaimed sand is then discharged into a mixer 47 for mixing with new no-bake binder to make new sand molds.

As mentioned before, heretofore state of the art foundry sand reclamation systems suffered the drawback that sand quality deteriorated with transporting and other handling from the "unit" reclaimer to the point of use. Such additional handling continues to scrub the sand and alter the characteristics of the sand. Therefore, the sand is not the same at the point of use as it was at the reclaimer's discharge.

The advantage of the present system is that the final steps of sand reclamation are done at the point of use. Sand is produced at the mixer 47 having known characteristics.

The effectiveness of the system in reclaiming foundry sand is demonstrated by the following test results, wherein sand samples were taken from various points in the system and analyzed.

| 1. Analysis of sand taken from the lump breaker 23: | | | | | | | | | | |
|---|---|---|---|---|---|---|---|---|---|---|
| A. Screen Analysis: | | | | | | | | | | |
| Screen Number: | 20 | 30 | 40 | 50 | 70 | 100 | 140 | 200 | 270 | Pan |
| % retained on Screen: | 2.13 | 1.18 | 8.67 | 26.75 | 34.17 | 20.64 | 4.62 | 1.62 | .42 | .41 |
| B. AFS No. = 53.40 | | | | | | | | | | |
| C. Base Perm = 131 | | | | | | | | | | |
| D. L.O.I. = 5.06 | | | | | | | | | | |
| 2. Analysis of sand entering the pneumatic transporter 33: | | | | | | | | | | |
| A. Screen Analysis: | | | | | | | | | | |
| Screen Number: | 20 | 30 | 40 | 50 | 70 | 100 | 140 | 200 | 270 | Pan |
| % retained on Screen: | .49 | .97 | 8.25 | 27.55 | 35.09 | 20.96 | 4.96 | 1.21 | .28 | .24 |
| B. AFS No. = 53.88 | | | | | | | | | | |
| C. Base Perm = 141 | | | | | | | | | | |
| D. L.O.I. — 4.892 | | | | | | | | | | |
| 3. Analysis of Reclaimed Sand entering the mixer 47: | | | | | | | | | | |
| A. Screen Analysis: | | | | | | | | | | |
| Screen Number: | 20 | 30 | 40 | 50 | 70 | 100 | 140 | 200 | 270 | Pan |
| % retained on Screen: | .17 | .38 | 4.33 | 25.52 | 39.81 | 23.41 | 4.94 | 1.01 | .27 | .16 |
| B. AFS No. = 55.28 | | | | | | | | | | |
| C. Base Perm = 157 | | | | | | | | | | |
| D. L.O.I. — 4.584 | | | | | | | | | | |
| 4. Analysis of material taken from the dust collector: | | | | | | | | | | |
| A. Screen Analysis: | | | | | | | | | | |
| Screen Number | 20 | 30 | 40 | 50 | 70 | 100 | 140 | 200 | 270 | Pan |
| % retained on Screen: | .05 | .41 | 2.95 | 6.59 | 7.13 | 3.28 | 2.55 | 5.86 | 8.35 | 62.58 |
| B. L.O.I. - 13.78 | | | | | | | | | | |

34 varies the free space exterior to the inlet and thereby the velocity of the air through the space is varied as indicated in describing the operation of the fluidizing air flow in sand reclaimer 10 of FIG. 1.

Sand entering the pneumatic transporter 33 is fluidized and pneumatically transported at a velocity sufficient for such transport by a conduit 41 to either of two sand reclaimers 10 of the type described in FIG. 1 by means of branch conduits 43 and 45. Located at the The screen analysis shows the distribution by weight percentages of sand in a sample according to grain fineness (the larger the screen number, the finer the sand that is retained on the screen). For effective sand reclamation, 80% or more of the sand should be retained on screens 40, 50, 70 and 100. It was found that present system for reclaiming and classifying used foundry sand produced sand at the point of use having the desired screen analysis.

The AFS number expresses the average grain fineness of the sample. New sand usually has an AFS number somewhere between 53 and 60. Because final classification takes place at the point of use, the present system produced reclaimed sand having the desired AFS number.

The Base Perm numbers indicate the permeability of the sand and the larger the number, the lower the fine content. The Base Perm number of the reclaimed sand at the mixer 47 corresponds to the Base Perm number for new sand.

The L.O.I. numbers indicate the percentage of the sample that was lost on ignition, and the degree of organic no-bake binder present is measured by the L.O.I. number. No sand reclaimer of the scrubber type will produce a sand completely free of organics. The analysis showed that less than 4.6% of the reclaimed sand at the mixer contained organic binder, indicating that the system was as efficient in reclaiming sand as the conventional reclaimers that accelerate the sand to high velocities and thereby consume much more power.

An analysis of the power requirements of this new system for reclaiming no-bake foundry sand confirms that significantly less energy is required then with conventional systems. For example, the sand lump breaker 23, the pneumatic transporter 22, and the dust collector constitute the major power consuming components of the present system. The sand reclaimer 10 is not a major power consuming component because sand is not therein accelerated to high velocities.

A conventional foundry sand reclamation system would also have a sand lump breaker, a pneumatic transporter, a dust collector and a reclaimer. However, the heretofore known air scrubber reclaimers, wherein sand is accelerated to high velocities to wear off the binder, would constitute a major power (H.P.) consuming component.

Systems that utilize conventional air scrubbers wherein sand is accelerated have been found to require 10 to $12\frac{1}{2}$ H.P. per ton of sand reclaimed. The present system advantageously utilizes the power for pneumatic transport for reclamation and therefore, only requires 5 to $7\frac{1}{2}$ H.P. per ton of reclaimed sand, a substantial energy savings.

Furthermore, because sand is not accelerated to high velocities for reclamation, much less sand is disintegrated and rendered useless as fines. The present system was tested and found to have a sand recovery coefficient of 92-94% for the system, a recovery efficiency much greater than systems utilizing air scrubbers that accelerate sand for reclamation.

It should be understood by those skilled in the art that various modifications may be made in the present invention without departing from the spirit and scope thereof as described in the specification and defined in the appended claims.

What is claimed is:

1. In an apparatus for removing no-bake rigid coatings encasing no-bake foundry sand and separating the rigid coatings from the sand grains after the no-bake foundry sand has been comminuted to coated sand grain particle size, having means for fluidizing and conveying said sand grain size coated sand grains in a conduit to said apparatus at velocity just sufficient for pneumatic transport, the improvement comprising, a chamber having a coated sand grain inlet thereto
said inlet arranged to direct a generally horizontal stream of coated particles into said chamber at substantially the same velocity as the velocity at which particles were transported in a fluidized state,
a rigid target in said chamber positioned and arranged in said chamber on the opposite side from said inlet such that the rigid surface thereof is impacted by said stream of coated particles such that by the energy of impact the coatings are fractured and form a downwardly directed curtain of uncoated sand and fractured coatings lying between and below said inlet and said rigid target,
a vent from said chamber above said inlet for removing fine dust,
separator means in said chamber below said rigid target and inlet and arranged to receive said curtain of falling particles, for separating said sand grains and said fractured coatings, and
exit means from said separator for separately discharging the uncoated sand grains and fractured coatings.

2. The apparatus recited in claim 1 wherein said separator means include a passageway, means for feeding said falling curtain of fractured coatings and uncoated sand grains into said passageway at a uniform rate, and means for inducing air flow across the curtain of falling particles to cause only sand grains of desired particle size to pass beyond the induced air flow.

3. The apparatus recited in claim 2 which further includes a regulating means cooperating with said passageway to control the velocity of the induced air flow across the falling curtain of fractured coatings and uncoated sand grains, said regulating means being adjustable for controlling the cross-sectional area of the passageway at the point at which the air flow is induced.

4. The apparatus as recited in claim 2, wherein the induced air flow through the falling curtain of fractured coatings and uncoated sand grains is in the range of perpendicular to the line of flow of sand to approximately an angle of 45° in a quadrant counter to the direction of the flowing sand.

5. The apparatus as recited in claim 2, which further includes a dust collector means for inducing the air flow and receiving the fines being removed from the foundry sand.

6. In an apparatus for removing no-bake rigid coatings encasing no-bake foundry sand and classifying the reclaimed sand grains according to particle size after the no-bake foundry sand has been comminuted to coated sand grain particle size, having means for fluidizing and conveying said sand grains size coated sand grains in a conduit to said apparatus at velocity just sufficient for pneumatic transport, the improvement comprising, a chamber having a coated sand grain inlet thereto
said inlet arranged to direct a generally horizontal stream of no-bake sand particles into said chamber at the same velocity as the velocity at which the particles were transported in fluidized state
a rigid target in said chamber positioned and arranged in said chamber on the opposite side from said inlet such that the rigid surface thereof is impacted by said stream coated particles such that by the energy of impact the coatings are fractured and form a downwardly directed curtain of uncoated sand and fractured coatings lying between and below said inlet and said rigid target, a first means adjacent said target for removing fractured no-bake coatings particles, a second means further removed from the target to complete the removal of fractured coating particles by inducing fluidizing air flow through a curtain of falling uncoated sand and fractured coatings at a velocity sufficient to separate fractured coatings and fine sand particles from sand grains of desired particle size and, exit means from said chamber for separately discharging the re-useable sand grains of desired particle size and fractured coatings and fine sand particles.

7. The apparatus as recited in claim 6, wherein said target has a wear resistant impact surface having an area at least as large as the cross-sectional area of the impacting stream of no-bake coated sand particles.

8. The apparatus as recited in claim 7, wherein the impact surface is concave.

9. The apparatus as recited in claim 7, wherein the impact surface has a parabolic shape.

10. The apparatus as recited in claim 6, wherein said chamber further includes, at least one ramp located below the target for receiving the falling curtain of fractured coatings and uncoated sand particles falling from the target, to direct said material to the particle separating air flow at a uniform rate and an adjustable flow gate means located at the remote end of the last ramp for controlling the quantity of material that can fall over the edge of the ramp and through the particle separating air flow.

11. The apparatus as recited in claim 6, wherein said second means for removing fractured coating particles and fine sand particles includes, a passageway through which the falling curtain of fractured coatings and uncoated sand falls, and a regulating means cooperating with said passageway to control the velocity of the induced air flow across the falling curtain of fractured coatings and uncoated sand particles, said regulating means including an adjustable member for controlling the cross-sectional area of the passageway at the point at which the air flow is induced.

12. The apparatus as recited in claim 6, wherein the induced air flow through the curtain of falling sand is in the range of perpendicular to the line of flow of sand to an angle of approximately 45° in a quadrant counter to the direction of the flowing sand.

13. The apparatus as recited in claim 6, which further includes a dust collector means for receiving fines from first and second fine removal means, and wherein said source of suction for first fine removal means and means for inducing classifying air flow in second fine removal means is derived from said dust collector means.

14. The apparatus as recited in claim 6, which further includes, means for crashing and reducing sand lumps to grain sized no-bake resin coated sand particles, means for fluidizing the sand particles for pneumatic transport, and means for conducting the particles to said apparatus for reclaiming and classifying.

15. In an apparatus for removing no-bake rigid coatings encasing no-bake foundry sand and classifying the reclaimed sand grains according to particle size after the no-bake foundry sand has been comminuted to coated sand grain particle size, having a means for fluidizing and conveying said sand grain size coated sand grains in a conduit, to said apparatus at a velocity just sufficient for pneumatic transport, the improvement comprising:

a chamber having a coated sand grain inlet thereto said inlet arranged to direct a generally horizontal stream of coated sand particles into said chamber at the same velocity as the velocity at which said particles were transported in a fluidized state, a rigid target having a concave wear resistant impact surface at least as large as the cross-sectional area of the stream of no-bake coated sand particles that will impact against it, arranged in said chamber on the opposite side from said stream of coated particles such that by the energy of impact the coatings are fractured and form a downwardly directed curtain of uncoated sand and fractured coatings lying between and below said inlet and said rigid target, a vent from said chamber located above said inlet in the upper portion of the chamber for exhausting fractured coating particles from said chamber, at least one ramp located below the target for descent of fractured coatings and uncoated sand particles falling from the target to the lower portion of the chamber, an adjustable flow gate located at the remote end of the last ramp for controlling the quantity of sand and fractured coatings that can pass over the edge of the ramp as a curtain of falling sand, a passageway located below the remote edge of the last ramp through which the sand falls, means for inducing air flow through the curtain of falling sand and coatings at velocity sufficient to separate fractured coatings and fine sand particles from the particle fall, so that only sand grains of desired particle size pass beyond the induced air flow, the induced air flow being in the range of perpendicular to the line of sand to approximately an angle of 45° in a quadrant counter to the direction of the flowing sand, a regulating means cooperating with said passageway to control the velocity of the induced air flow across the curtain of falling sand, said regulating means including an adjustable member for controlling the cross-sectional area of the passageway at the point at which the air flow is induced, and an exit means from said chamber for separately discharging the re-useable sand grains of desired particle size and the fractured no-bake coatings and fine sand particles.

* * * * *